United States Patent
Jia

(10) Patent No.: US 12,322,877 B2
(45) Date of Patent: Jun. 3, 2025

(54) ANTENNA APPARATUS AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 361 days.

(21) Appl. No.: 17/972,066

(22) Filed: Oct. 24, 2022

(65) Prior Publication Data

US 2023/0040011 A1 Feb. 9, 2023

Related U.S. Application Data

(63) Continuation of application No. PCT/CN2021/076016, filed on Feb. 8, 2021.

(30) Foreign Application Priority Data

Apr. 24, 2020 (CN) .......................... 202010335728.5
Apr. 24, 2020 (CN) .......................... 202020641216.7

(51) Int. Cl.
*H01Q 7/00* (2006.01)

(52) U.S. Cl.
CPC ..................................... *H01Q 7/00* (2013.01)

(58) Field of Classification Search
CPC ....................................................... H01Q 7/00
See application file for complete search history.

(56) References Cited

U.S. PATENT DOCUMENTS 6,208,235 B1 3/2001 Trontelj
2011/0227799 A1 9/2011 Hashimoto
(Continued)

FOREIGN PATENT DOCUMENTS

CN 103178346 A 6/2013
CN 204335178 U 5/2015
(Continued)

OTHER PUBLICATIONS

Extended European Search Report for EP Application 21791747.5 mailed Sep. 8, 2023. (8 pages).
(Continued)

*Primary Examiner* — Graham P Smith
(74) *Attorney, Agent, or Firm* — Young Basile Hanlon & MacFarlane, P.C.

(57) ABSTRACT

An antenna apparatus and an electronic device are provided. The antenna apparatus includes a dielectric substrate, a conductive element, and an antenna coil disposed on a first surface of the dielectric substrate. The antenna coil includes a winding center part, at least one first conductor segment and at least one second conductor segment respectively disposed on two opposite sides of the winding center part, the first conductor segment and the second conductor segment are in series connection. The conductive element is disposed on a second surface of the dielectric substrate opposite to the first surface or disposed in an interior of the dielectric substrate, disposed opposite to the first conductor segment, and the conductive element is electrically connected to the first conductor segment. Orthographic projection of the conductive element on the dielectric substrate covers at least one part of orthographic projection of the first conductor segment on the dielectric substrate.

19 Claims, 10 Drawing Sheets

(56) References Cited

U.S. PATENT DOCUMENTS

| | | |
|---|---|---|
| 2013/0271145 A1 | 10/2013 | Hwang et al. |
| 2017/0054213 A1 | 2/2017 | Singh et al. |
| 2017/0194711 A1 | 7/2017 | Nakano |

FOREIGN PATENT DOCUMENTS

| | | |
|---|---|---|
| CN | 105071022 A | 11/2015 |
| CN | 105576343 A | 5/2016 |
| CN | 106452518 A | 2/2017 |
| CN | 105103373 B | 6/2018 |
| CN | 208548459 U | 2/2019 |
| CN | 110416715 A | 11/2019 |
| CN | 110416731 A | 11/2019 |
| CN | 110429386 A | 11/2019 |
| CN | 110445972 A | 11/2019 |
| CN | 111342228 A | 6/2020 |
| CN | 211605406 U | 9/2020 |
| JP | 2005192044 A | 7/2005 |
| JP | 2005192124 A | 7/2005 |
| JP | 2012095350 A | 5/2012 |

OTHER PUBLICATIONS

Chinese First Office Action with English translation, fpr Chinese Application No. 202010335728.5, mailed Jun. 25, 2024, 20 pages.
International search report and Written Opinion with English Translation of the International Search Authority, International Application No. PCT/CN2021/076016, mailed May 17, 2021 (15 pages).
Chinese Second Office Action with English translation, for Chinese Application No. 202010335728.5, mailed Oct. 31, 2024, 22 pages.
Chinese Notification to Grant Patent Right for Invention with English translation, Chinese Application No. 202010335728.5, mailed Jan. 20, 2025, 5 pages.

ANTENNA APPARATUS AND ELECTRONIC DEVICE

CROSS-REFERENCE TO RELATED APPLICATION(S)

The present application is a continuation-application of International (PCT) Patent Application No. PCT/CN2021/076016, filed on Feb. 8, 2021, which claims priorities to Chinese Patent Application Nos. 202010335728.5 and 202020641216.7, both filed on Apr. 24, 2020, the contents of all of which are herein incorporated by reference in their entireties.

TECHNICAL FIELD

The present disclosure relates to the field of electronic technologies, and in particular to an antenna apparatus and an electronic device.

BACKGROUND

An electronic device exchanges data through a near field communication (NFC) technology to achieve functions such as mobile payment, electronic ticketing, access control, mobile identity recognition, anti-counterfeiting, etc.

However, space in the electronic device is limited, and an NFC antenna needs to meet the requirements of miniaturization. A structure of a miniaturized NFC antenna is limited by the space in the electronic device, resulting in cancellation of the magnetic field generated by coil in the area where spatial magnetic field of the miniaturized NFC antenna overlaps, which reduces communication performance of the electronic device and reduces communication distance.

SUMMARY

In a first aspect, an antenna apparatus is provided, and includes a dielectric substrate, a conductive element and an antenna coil disposed on a first surface of the dielectric substrate; the antenna coil includes a winding center part, at least one first conductor segment and at least one second conductor segment, the first conductor segment and the second conductor segment are respectively disposed on two opposite sides of the winding center par, the first conductor segment and the second conductor segment are in series connection; the conductive element is disposed on a second surface of the dielectric substrate opposite to the first surface or disposed in an interior of the dielectric substrate, disposed opposite to the first conductor segment, and the conductive element is electrically connected to the first conductor segment; orthographic projection of the conductive element on the dielectric substrate covers at least one part of orthographic projection of the first conductor segment on the dielectric substrate; a magnetic field generated by the conductive element is configured to cancel out a magnetic field generated by the first conductor segment.

In a second aspect, an electronic device is provided, and includes a camera module and the antenna apparatus mentioned above, the antenna apparatus is disposed around the camera module; or the antenna apparatus is disposed opposite to the camera module.

BRIEF DESCRIPTION OF DRAWINGS

In order to clearly explain the technical solution in embodiments of the present disclosure, the following will briefly introduce the drawings that need to be used in the embodiments.

DETAILED DESCRIPTION

In the following, technical solutions in embodiments of the present disclosure will be described clearly and completely in combination with the drawings in the embodiments of the present disclosure. Obviously, the embodiments are only part of embodiments of the present disclosure, not all of them. The embodiments listed in the present disclosure can be properly combined with each other.

Figure 1:
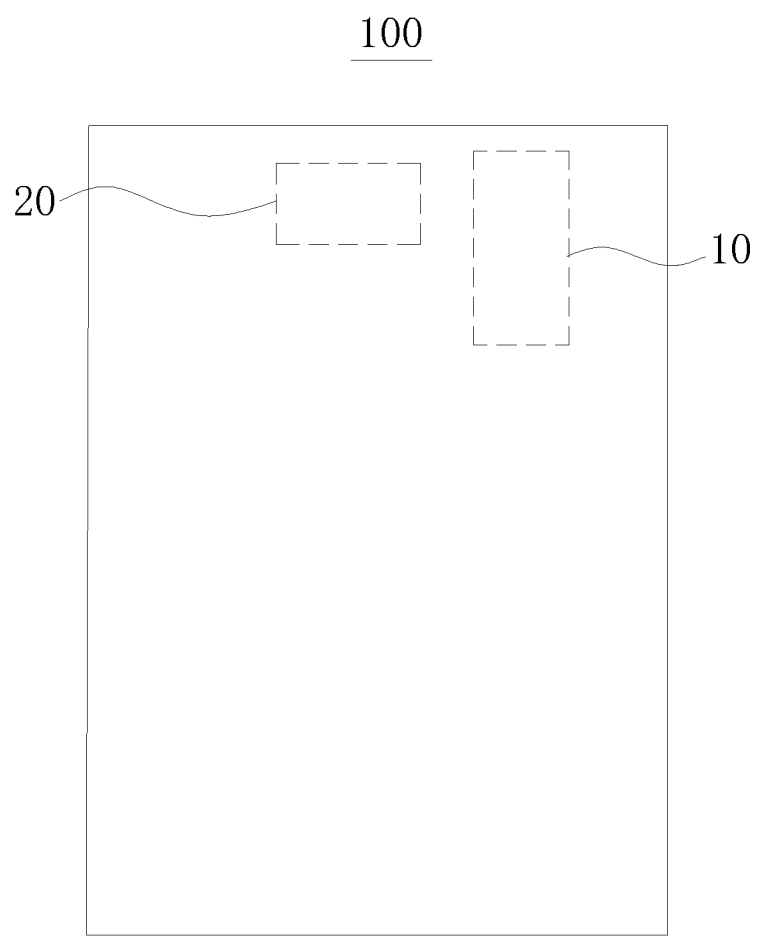
FIG. 1 is a structural schematic view of an electronic device according to a first embodiment of the present disclosure.

As shown in FIG. 1, an electronic device 100 with a near field communication function is provided according to an embodiment of the present disclosure. For example, the electronic device 100 may be a device with mobile communication function such as a mobile phone, a tablet, laptops, a handheld computer, a laptop, a netbook, a media player, a watch, a necklace, a glass, or the like. Embodiments of the present disclosure take a mobile phone as examples.

Figure 2:
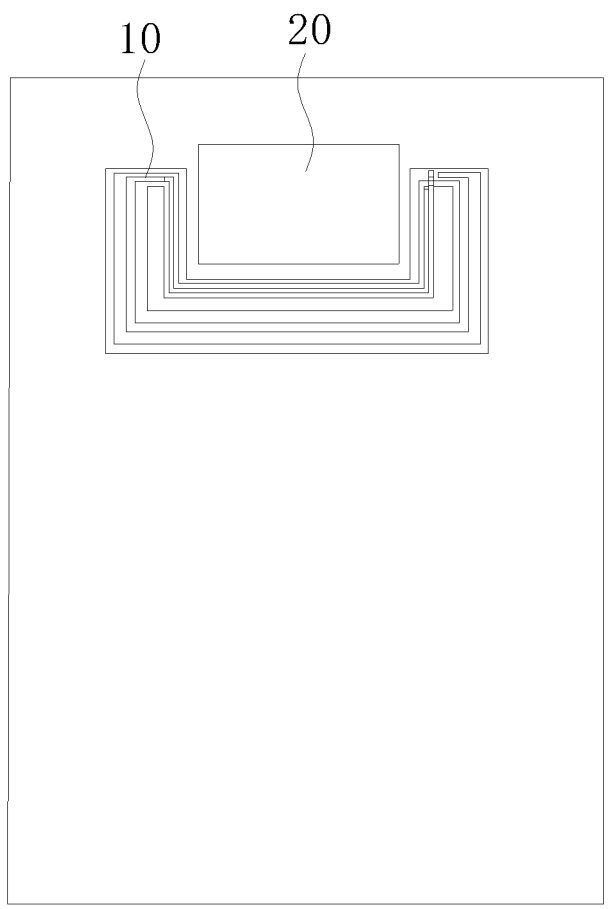
FIG. 2 is a structural schematic view of an electronic device according to a second embodiment of the present disclosure.
Figure 3:
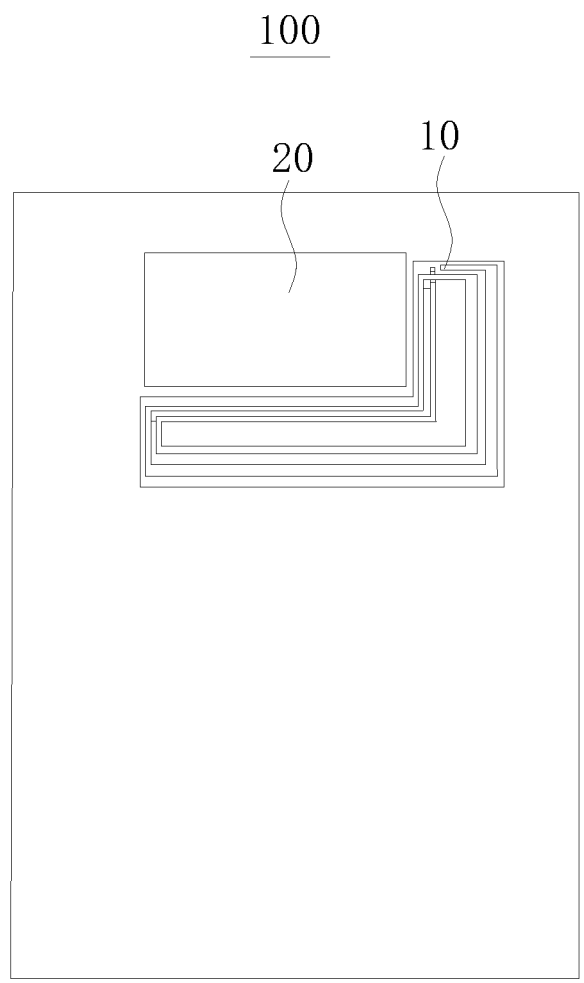
FIG. 3 is a structural schematic view of an electronic device according to a third embodiment of the present disclosure.

As shown in FIG. 1, FIG. 1 is structural schematic view of the electronic device 100 according to an embodiment of the present disclosure. An antenna apparatus 10 and a camera module 20. The electronic device 100 and external devices may transmit data information with each other through the antenna apparatus 10 to achieve communication function. Shape of the antenna apparatus 10 may be substantially rectangular. In some embodiments, as shown in FIGS. 2 and 3, the shape of the antenna apparatus 10 may be U-shaped or L-shaped to adapt to adding the camera module 20, lacking stacking area, and irregular shape in the electronic device 100, such that the electronic device 100 can have good performance in a situation of lacking internal space. In some embodiments, the special-shaped antenna apparatus 10 may be configured to avoid other antenna modules and electronic components in the electronic device 100, such as a face recognition module, an ambient light sensor, a distance sensor, and an iris recognition module. It can be understood that the shape of the antenna apparatus 10 may include but not limit to the U shape, L shape and the rectangular.

Following embodiments take the rectangle antenna apparatus 10 as an example, which is not repeated.

Figure 4:
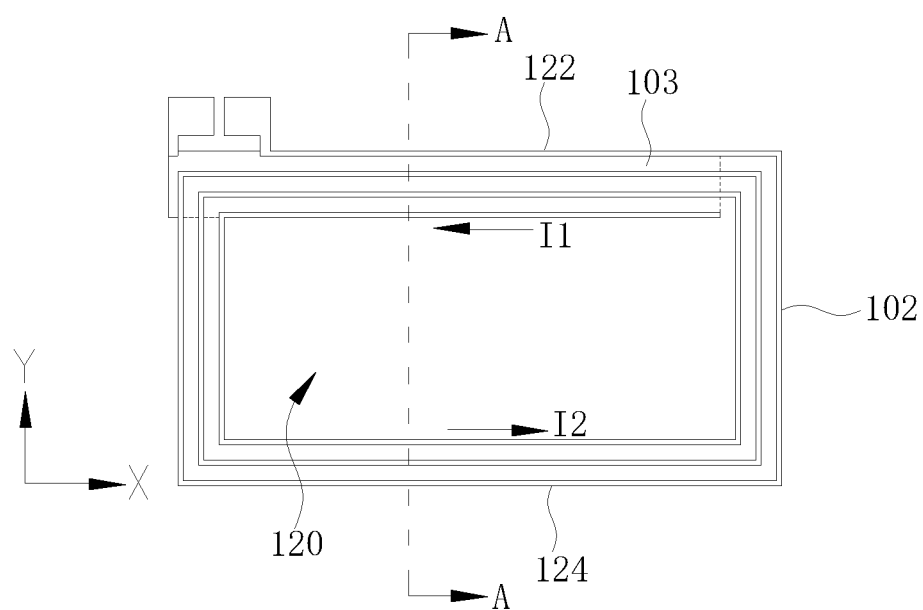
FIG. 4 is a structural schematic view of an antenna apparatus according to an embodiment of the present disclosure.
Figure 5:
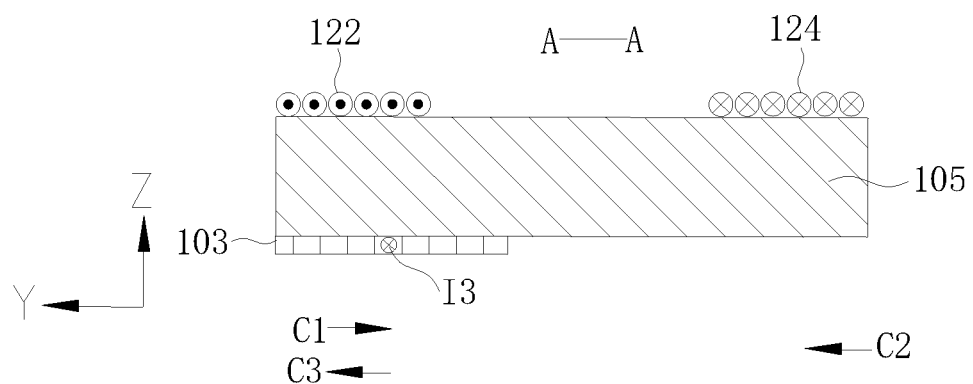
FIG. 5 is a cross-sectional structural schematic view of an antenna apparatus along a direction of line A-A in FIG. 4 according to an embodiment of the present disclosure.

As shown in FIGS. 4 and 5, FIG. 4 is a structural schematic view of the antenna apparatus 10 according to an embodiment of the present disclosure. The antenna apparatus 10 may include a dielectric substrate 105, an antenna coil 102, and a conductive element 103.

In embodiments of the present disclosure, length direction of the antenna apparatus 10 may be determined as X axis direction, width direction the antenna apparatus 10 may be determined as Y axis direction, thickness direction of the antenna apparatus 10 may be determined as Z axis direction, arrows may indicate forward direction "•" and "X" may indicate current direction, C1 may indicate direction of magnetic field generated by current in first conductor segment 122, C2 may indicate direction of magnetic field generated by current in second conductor segment 124, C3 may indicate direction of magnetic field generated by current in conductive element 103, which is not repeated.

The dielectric substrate 105 may be used to support the antenna coil 102 and the conductive element 103. Length direction, width direction, and thickness direction of the conductive element 103 may respectively be the X axis direction, Y axis direction, and the Z axis direction of the antenna apparatus 10. In some embodiments, the dielectric substrate 105 may be made of polyimide film (PI) which may be base material of flexible printed circuit (FPC). In other embodiments, the dielectric substrate 105 may be made of polyethylene terephthalate (PET). In the embodiments of the present disclosure, the shape of the dielectric substrate 105 and the antenna coil 102 may be rectangular.

The antenna coil 102 may be understood as a rectangle wire winding. The antenna coil 102 may be disposed on the dielectric substrate 105. Specifically, the antenna coil 102 may be disposed on a first surface of the dielectric substrate or in an interior of the dielectric substrate 105. The antenna coil 102 may be disposed on the dielectric substrate 105 through any one process of winding, printing, and etching.

In some embodiments, as shown in FIGS. 4 and 5, the antenna coil 102 disposed on/in the dielectric substrate 105 includes a winding center part 120, a first conductor segment 122, and a second conductor segment 124, the first conductor segment 122 and the second conductor segment 124 is disposed on two opposite side of the winding center part 120. The winding center part 120 is a region between the first conductor segment 122 and the second conductor segment 124.

Figure 6:
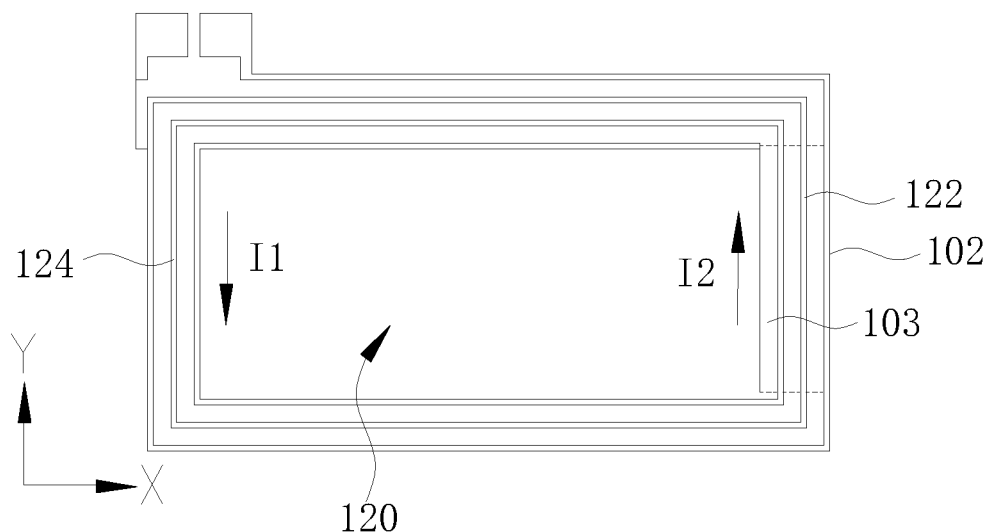
FIG. 6 is a structural schematic view of an antenna apparatus according to second embodiment of the present disclosure.
Figure 7:
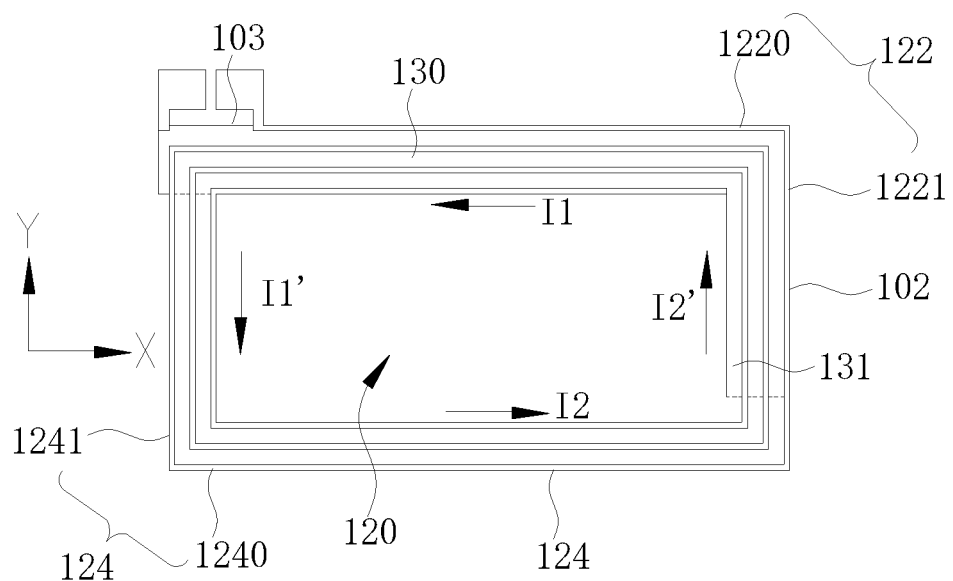
FIG. 7 is a structural schematic view of an antenna apparatus according to third embodiment of the present disclosure.

As shown in FIG. 4, the first conductor segment 122 and the second conductor segment 124 may be two wire windings are disposed opposite to each other along the Y axis. In other embodiments, as shown in FIG. 6, the first conductor segment 122 and the second conductor segment 124 may be two wire windings are disposed opposite to each other along the X axis. In some embodiments, as shown in FIG. 7, the first conductor segment 122 may include a first conductor sub-segment 1220 and a second conductor sub-segment 1221, and the second conductor segment 124 may include a third conductor sub-segment 1240 and a fourth conductor sub-segment 1241. The first conductor sub-segment 1220 and the third conductor sub-segment 1240 may be respectively disposed on two opposite sides of the winding center part 120 along the Y axis, and the second conductor sub-segment 1221 and the fourth conductor sub-segment 1241 may be respectively disposed on two opposite sides of the winding center part 120 along the X axis.

Specially, the first conductor segment 122 may be a wire disposed on a side of the winding center part 120 toward to forward direction of the Y axis. The second conductor segment 124 may be a wire disposed on a side of the winding center part 120 toward to backward direction of the Y axis. The first conductor segment 122 and the second conductor segment 124 may be one or more wires. The number of the first conductor segment 122 and the second conductor segment 124 may be same or different. It should be understood that the first conductor segment 122 and the second conductor segment 124 may be whole wire respectively or different parts of a whole wire. In other words, the first conductor segment 122 and the second conductor segment 124 may be one-piece structure or connected to each other.

In some embodiments, direction of current in the antenna coil 102 is shown in FIG. 4. I1 may be indicate direction of current in the first conductor segment 122, and I2 may be indicate direction of current in the second conductor segment 124. It should be understood that the first conductor segment 122 and the second conductor segment 124 that is disposed on two opposite side of the winding center part 120 are in series connection, such that the direction of current in the first conductor segment 122 is opposite to the direction of current in the second conductor segment 124. Distance between the first conductor segment 122 and the second conductor segment 124 may be close to meet miniaturization requirement of the antenna apparatus. Therefore, the magnetic field generated by the first conductor segment 122 and the magnetic field generated by the second conductor segment 124 may have overlapping region. Since the direction of current in the first conductor segment 122 is opposite to the direction of current in the second conductor segment 124, direction of the magnetic field generated by the first conductor segment 122 is different from direction of the magnetic field generated by the second conductor segment 124, and the magnetic field generated by the first conductor segment 122 may be cancel out the magnetic field generated by the second conductor segment 124. It should be noted that direction of the magnetic field generated by the first conductor segment 122 being different from direction of the magnetic field generated by the second conductor segment 124 indicate that the direction of the magnetic field generated by the first conductor segment 122 may be opposite to the direction of the magnetic field generated by the second conductor segment 124. In some embodiments, there is an included angle between the direction of the magnetic field generated by the first conductor segment 122 and the direction of the magnetic field generated by the second conductor segment 124.

The conductive element 103 is disposed on the dielectric substrate 105. Specifically, the conductive element 103 may be disposed on the dielectric substrate 105 through any one process of winding, printing, and etching. The conductive element 103 may be disposed on a second surface of the dielectric substrate 105 opposite to the first surface or disposed in the interior of the dielectric substrate 105, For example, the antenna coil 102 and the conductive element 103 may be disposed on two opposite surfaces respectively. In some embodiments, the antenna coil 102 and the conductive element 103 may be disposed on the interior of the dielectric substrate 105, and the antenna coil 102 and the conductive element 103 may be spaced apart. In some embodiments, the conductive element 103 may be disposed close to the first conductor segment 122 and far away from the second conductor segment 124. The conductive element 103 and the antenna coil 102 may be oppositely disposed. In some embodiments, the conductive element 103 may be disposed opposite to the antenna coil 102 and along direction of thickness of the dielectric substrate 105. It should be understood that, in other embodiments, the conductive element 103 may be disposed opposite to the antenna coil 102 and along direction of length or width of the dielectric substrate 105. The embodiments of the present disclosure take the conductive element 103 being disposed opposite to the antenna coil 102 and along direction of thickness of the dielectric substrate 105 as examples.

In some embodiments, as shown in FIG. 4, the first conductor segment 122 and the second conductor segment 124 may extend along the direction of the X axis, and the first conductor segment 122 and the second conductor segment 124 may be oppositely disposed along the direction of the Y axis. The conductive element 103 may extend along the direction of the X axis, and the conductive element 103 and the first conductor segment 122 may be oppositely disposed along the direction of the Z axis. In other embodiments, as shown in FIG. 6, the first conductor segment 122 and the second conductor segment 124 may extend to the direction of the Y axis, and the first conductor segment 122 and the second conductor segment 124 may be oppositely disposed along the direction of the X axis. The conductive element 103 may extend along the direction of the Y axis, and the conductive element 103 and the first conductor segment 122 may be oppositely disposed along the direction of the Z axis. In some embodiments, as shown in FIG. 7, the first conductor sub-segment 1220 of the first conductor segment 122 may extend along the direction of the X axis, and the second conductor sub-segment 1221 of the first conductor segment 122 may extend along the direction of the X axis. The third conductor sub-segment 1240 of the second conductor segment 124 may extend along the direction of the X axis, and the fourth conductor sub-segment 1241 of the second conductor segment 124 may extend along the direction of the Y axis. The first conductor sub-segment 1220 and the third conductor sub-segment 1240 may be oppositely disposed along the direction of the Y axis, and the second conductor sub-segment 1221 and the fourth conductor sub-segment 1241 may be oppositely disposed along the direction of the X axis. The conductive element 103 may include a first conductive part 130 and a second conductive part 131. The first conductive part 130 may extend along the X axis, and first conductive part 130 and the first conductor sub-segment 1220 of the first conductor segment 122 may be oppositely disposed along the direction of the Z axis. The second conductive part 131 may extend along the Y axis, and the second conductive part 131 and the second conductor sub-segment 1221 of the first conductor segment 122 may be oppositely disposed along the forward of the Z axis. The first conductive part 130 and the second conductive part 131 may be one-piece structure, connected to each other, or spaced apart. In the antenna apparatus 10 in FIG. 7, the first conductive part 130 is configured to cancel out the magnetic field generated by the first conductor sub-segment 1220 to enhance magnetic field strength around the third conductor sub-segment 1240, increase communication distance, and improve communication performance of the electronic device 100. the second conductive part 131 is configured to cancel out the magnetic field generated by the second conductor sub-segment 1221 to enhance magnetic field strength around the fourth conductor sub-segment 1241, increase communication distance, and improve communication performance of the electronic device 100.

The conductive element 103 may be electronically connected to the antenna coil 102. In some embodiments, the conductive element 103 and the antenna coil 102 may be in series connection. As shown in FIG. 5,13 may indicate direction of current in the conductive element 103. The direction of the current in the conductive element 103 is opposite to the direction of the current in the first conductor segment 122, such that magnetic field generated by the current in the conductive element 103 may partly cancel out the magnetic field generated by the current in the first conductor segment 122. Specifically, as shown in FIGS. 4 and 5, the direction of the current in the first conductor segment 122 may be the same as the backward of the X axis, and the direction of the current in the conductive element 103 may be the same as the forward of the X axis. The first conductor segment 122 may generate the magnetic field along direction C1 on a side of the dielectric substrate 105 away from the antenna coil 102. The conductive element 103 may generate the magnetic field along direction C3 on a side of the dielectric substrate 105 away from the antenna coil 102. The direction of the magnetic field generated by the conductive element 103 may be opposite to the direction of the magnetic field generated by the first conductor segment 122, such that the magnetic field generated by the conductive element 103 can cancel out the magnetic field generated by the first conductor segment 122, and the magnetic field, generated by the conductive element 103, in a side of the conductive element 103 away from the dielectric substrate 105 can cancel out the magnetic field, generated by the first conductor segment 122, in the side of the conductive element 103 away from the dielectric substrate 105, thereby reducing influence of the magnetic field generated by the first conductor segment 122 on the magnetic field generated by the second conductor segment 124.

In some embodiments, the conductive element 103 may be wire with conductivity such as a nano copper wire or a nano silver wire. In other embodiments, the conductive element 103 may be a conductive substrate, and the conductive substrate may be made of metal, graphene, conductive polymer and other materials.

The conductive element 103 disposed in the antenna apparatus 10 may generate the magnetic field configured to cancel out the magnetic field generated by the first conductor segment 122. In response to the magnetic field generated by the first conductor segment 122 being partly cancelled out, the magnetic field generated by the first conductor segment 122 on a side of the winding center part 120 weakens. Therefore, the magnetic field generated by the first conductor segment 122 may cancel out less magnetic field generated by the second conductor segment 124 in the overlapping region, and the magnetic field strength around the second conductor segment 124 may be enhanced, such that the second conductor segment 124 may be a main radiator to increase communication distance and improve communication performance of the electronic device 100.

Figure 8:
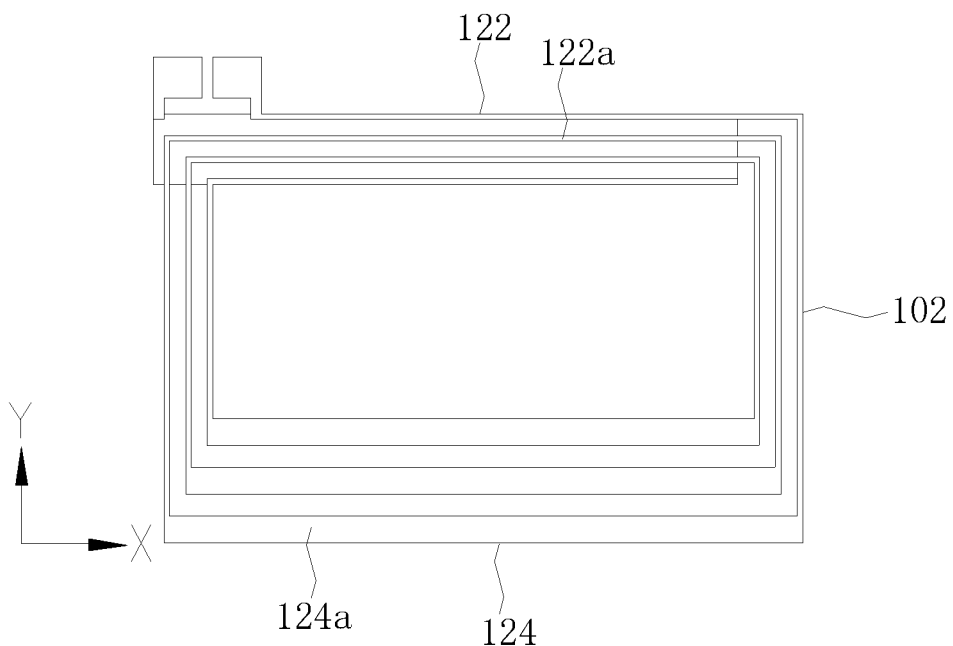
FIG. 8 is a structural schematic view of an antenna apparatus according to fourth embodiment of the present disclosure.

As shown in FIG. 8, the number of the first conductor segment 122 and the second conductor segment 124 may be one or more. In the embodiments of the present disclosure, the number of the first conductor segment 122 and the second conductor segment 124 may be wire. In some embodiments, the antenna coil 102 may include a plurality of first wires 122a and second wire 124a. Along direction of the first conductor segment 122 toward to the second conductor segment 124, i.e., along the direction of Y axis, a width of the first wires 122a may be less than the second wire 124a. It may be understood that the first wires 122a and the second wire 124a may be wires with different diameter, and the second wire 124a is thicker than and the first wire 122a.

The first conductor segment 122 and the second conductor segment 124 may be wire with different width, such that first conductor segment 122 is finer, and the magnetic field generated by the first conductor segment 122 has smaller magnetic field strength. Therefore, the magnetic field generated by the first conductor segment 122 may cancel out less magnetic field generated by the second conductor segment 124. The second conductor segment 124 may be thicker, and the magnetic field generated by the second conductor segment 124 has larger magnetic field strength, such that the second conductor segment 124 may be the main radiator.

Figure 9:
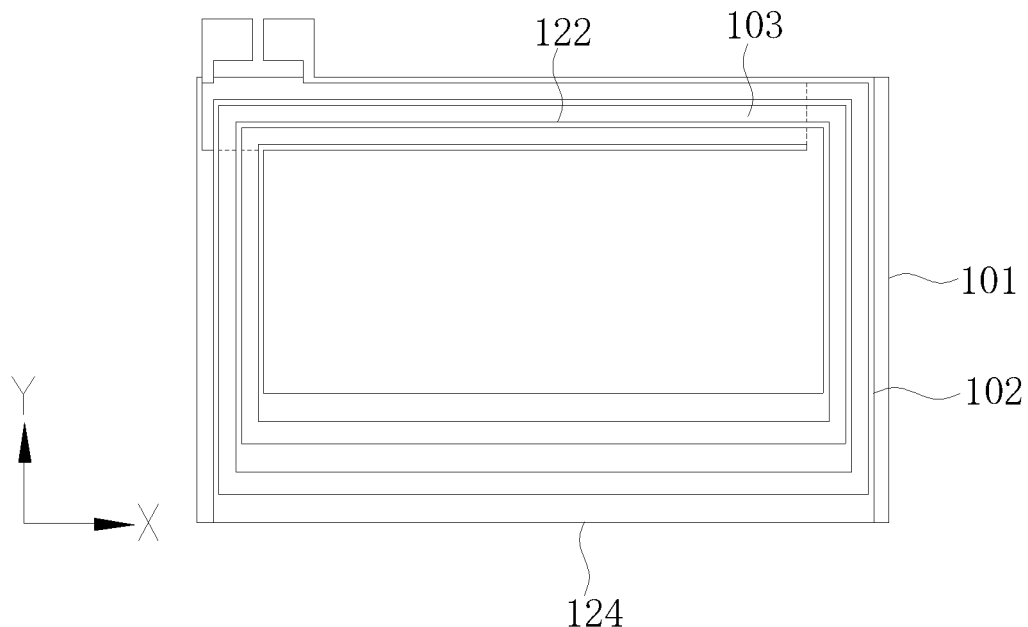
FIG. 9 is a structural schematic view of an antenna apparatus according to fifth embodiment of the present disclosure.

Further, as shown in FIG. 9, the antenna apparatus 10 may include magnetic substrate 101. In some embodiments, the magnetic substrate 101 and the dielectric substrate 105 (as shown in FIG. 5) may oppositely disposed along the thickness of the antenna apparatus 10. The magnetic substrate 101 may be disposed on a side of the dielectric substrate 105 toward to the backward of the Z axis. The magnetic substrate 101 may be ferrite core.

Specifically, orthographic projection of the magnetic substrate 101 on a plane where the antenna coil 102 is located may cover at least part of the second conductor segment 124.

In some embodiments, as shown in FIG. 9, shape of the magnetic substrate may be substantially rectangular. The orthographic projection of the magnetic substrate 101 on the plane where the antenna coil 102 is located may extend to the first conductor segment 122 and the second conductor segment 124 in the Y axis. The plane where the antenna coil 102 is located may be parallel to a plane where the X axis and the Y axis are located. Orthographic projection of the first conductor segment 122 on the Z axis may close to an end of the magnetic substrate 101, and orthographic projection of the second conductor segment 124 on the Z axis may close to another end of the magnetic substrate 101.

The magnetic substrate 101 may be configured to support the first conductor segment 122 and the second conductor segment 124. In addition, the magnetic substrate 101 has lower magnetoresistivity, thereby enhancing the magnetic field generated by the first conductor segment 122 and the second conductor segment 124.

Figure 10:
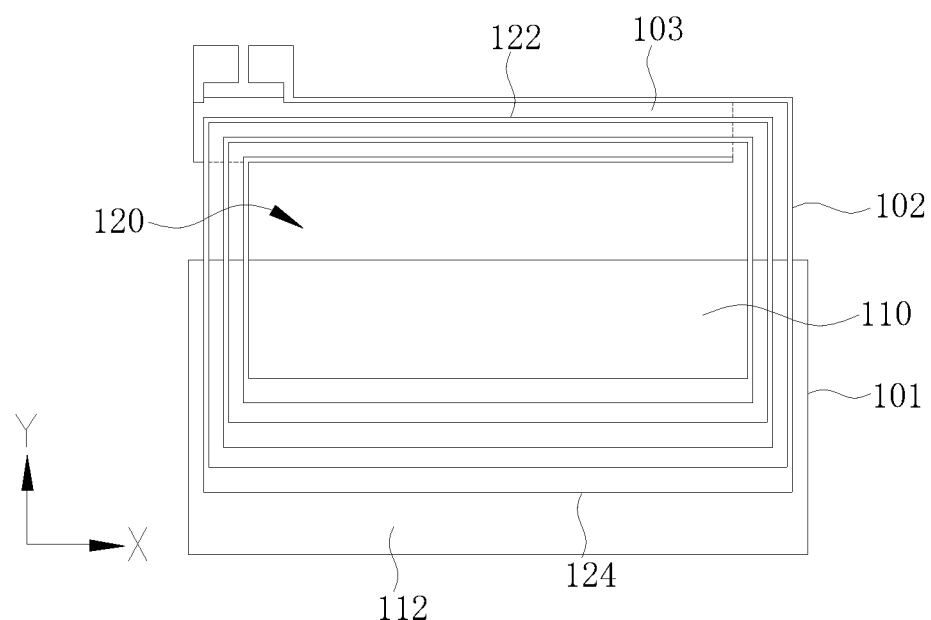
FIG. 10 is a structural schematic view of an antenna apparatus according to sixth embodiment of the present disclosure.

In other embodiments, as shown in FIG. 10, the magnetic substrate 101 may include a first magnetic region 110 and a second magnetic region 112. Orthographic projection of the first magnetic region 110 on the plane where the antenna coil 102 is located may cover a part of the winding center part 120. Orthographic projection of the second magnetic region 112 on the plane where the antenna coil 102 is located may be located on the side of the second conductor segment 124 away from the winding center part 120. Orthographic projection of the second conductor segment 124 along the Z axis may be located between the first magnetic region 110 and the second magnetic region 112. Orthographic projection of the first conductor segment 122 along the Z axis may be located out of the magnetic substrate 101.

The second magnetic region 112 may enable more magnetic field on a side of the second conductor segment 124 away from the winding center part 120 to pass through the magnetic substrate 101. Since the magnetic substrate 101 has lower magnetoresistivity, the magnetic field strength of the magnetic field generated by the second conductor segment 124 can be enhance. In addition, the first conductor segment 122 may be away from the magnetic substrate 101, such that less magnetic field generated by the first conductor segment 122 pass through the magnetic substrate 101, thereby reducing influence of the magnetic field generated by the first conductor segment 122 on the magnetic field generated by the second conductor segment 124.

Figure 11:
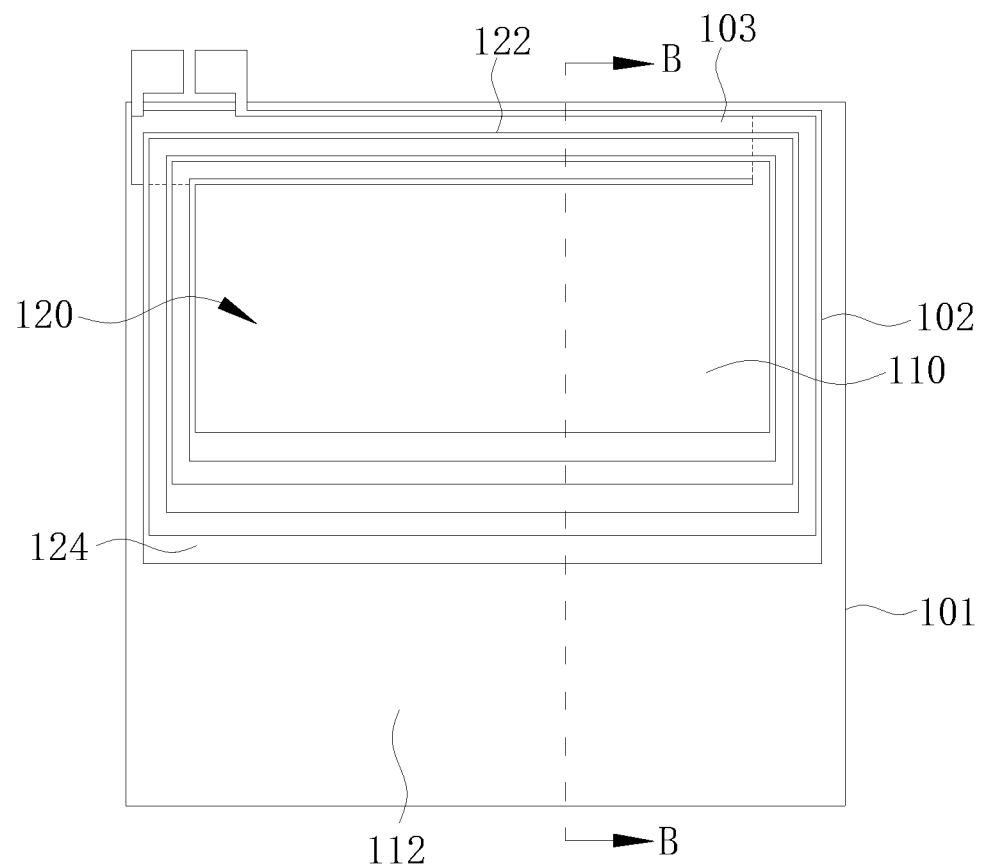
FIG. 11 is a structural schematic view of an antenna apparatus according to seventh embodiment of the present disclosure.

In some embodiments, as shown in FIG. 11, the orthographic projection of the second magnetic region 112 on the plane where the antenna coil 102 is located may be larger than or equal to the orthographic projection of the first magnetic region 110 on the plane where the antenna coil 102 is located. That is, area of the second magnetic region 112 on plane of the X axis and the Y axis may larger than or equal to area of the first magnetic region 110 on plane of the X axis and the Y axis.

Since the orthographic projection of the second magnetic region 112 on the plane where the antenna coil 102 is located may be larger than or equal to the orthographic projection of the first magnetic region 110 on the plane where the antenna coil 102 is located, the magnetic field on the side of the second conductor segment 124 away from the winding center part 120 can pass through the magnetic substrate 101. Since the magnetic substrate 101 has lower magnetoresistivity, the magnetic field strength of the magnetic field generated by the second conductor segment 124 can be enhanced.

It should be understood that, whether the orthographic projection of the magnetic substrate 101 on the plane where the antenna coil 102 is located cover the first conductor segment 122, the area of the second magnetic region 112 on the plane of the X axis and the Y axis, and the area of the first magnetic region 110 on the plane of the X axis and the Y axis may be combined or split based on actual situation.

Structure and position of the conductive element 103 is taken as examples in following embodiments.

Figure 12:
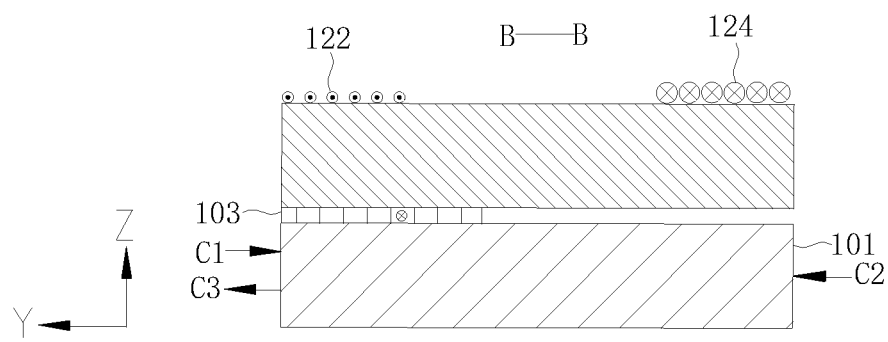
FIG. 12 is a cross-sectional structural schematic view of an antenna apparatus along a direction of line B-B in FIG. 11 according to an embodiment of the present disclosure.

In some embodiments, as shown in FIGS. 11 and 12, the conductive element 103 may be close to the first conductor segment 122 and disposed opposite to the first conductor segment 122 along direction of the antenna coil 102 toward to the magnetic substrate 101. In other words, the conductive element 103 may be disposed opposite to the first conductor segment 122 along the Z axis.

The direction of the current in the conductive element 103 may be opposite to the direction of the current in the first conductor segment 122, such that the direction of the magnetic field generated by the conductive element 103 disposed on the magnetic substrate 101 is opposite to the direction of the magnetic field generated by the first conductor segment 122. Therefore, the magnetic field generated by the conductive element 103 disposed on the magnetic substrate 101 can cancel out the magnetic field generated by the first conductor segment 122 and further weaken magnetic conduction effect of the magnetic substrate 101 to the first conductor segment 122, thereby enhancing the magnetic field strength around the second conductor segment 124.

In some embodiments, as shown in FIGS. 11 and 12, the conductive element 103 may be disposed between the antenna coil 102 and the conductive element 103. In other words, the antenna coil 102, the conductive element 103, and the magnetic substrate 101 may be orderly disposed. The current in the first conductor segment 122 is opposite to the forward of the X axis, and the current in the conductive element 103 is the same as the forward of the X axis. In other words, the current in the first conductor segment 122 is opposite to the current in the conductive element 103. In this way, direction of magnetic field generated by the first conductor segment 122 on the magnetic substrate 101 may be the same as the forward of the Y axis, and direction of magnetic field generated by the conductive element 103 on the magnetic substrate 101 may be opposite to the forward of the Y axis. Therefore, the magnetic field generated by the conductive element 103 on the magnetic substrate 101 can cancel out the magnetic field generated by the first conductor segment 122 on the magnetic substrate 101. In addition, the conductive element 103 can enhance magnetic field strength of magnetic field generated by the second conductor segment 124 in the same direction as the magnetic field.

In other embodiments, the conductive element 103 may be also disposed on a side of the antenna coil 102 away from the magnetic substrate 101. In other words, the conductive element 103, the antenna coil 102, and the magnetic substrate 101 may be orderly disposed along the backward of the Z axis. The direction of the current in the conductive element 103 is opposite to the direction of the current in the first conductor segment 122, such that the direction of magnetic field generated by the conductive element 103 on the magnetic substrate 101 is opposite to direction of magnetic field generated by the first conductor segment 122 on the magnetic substrate 101.

In some embodiments, orthographic projection of the conductive element 103 on the plane where the antenna coil 102 is located cover the first conductor segment 122. In other words, the orthographic projection of the conductive element 103 on the plane where the magnetic substrate 101 is located and the orthographic projection of the conductive element 103 on the plane where the magnetic substrate 101 is located may partly overlap.

Orthographic projection of the conductive element 103 on the plane where the magnetic substrate 101 is located may cover orthographic projection of the first conductor segment 122 on the plane where the magnetic substrate 101 is located, such that the magnetic field generated by the conductive element 103 can cancel out the magnetic field generated by the first conductor segment 122, thereby improving performance of the antenna apparatus 10.

Specifically, as shown in FIGS. 11 and 12, the antenna coil 102 and the magnetic substrate 101 may be disposed along the plane of the X axis and the Y axis. The conductive element 103 and the first conductor segment 122 may be oppositely disposed along the Z axis. The first conductor segment 122 may include a plurality of wires side by side on the plane of the X axis and the Y axis. Along the forward of the Y axis, the conductive element 103 may be a substrate wider than the first conductor segment 122. It should be understood that, in the plane of the X axis and Y axis, area of the conductive element 103 may larger than or equal to area of the first conductor segment 122. In other embodiments, the area of the conductive element 103 may smaller than the area of the first conductor segment 122. When the first conductor segment 122 includes one wire, area of the first conductor segment 122 is cross-sectional area of the one wire on the plane of the X axis and the Y axis. When the first conductor segment 122 includes a plurality of wires, area of the first conductor segment 122 is sum of cross-sectional area of the plurality of wires and space between the plurality of wires on the plane of the X axis and the Y axis.

The conductive element 103 and the first conductor segment 122 may be oppositely disposed along the Z axis, such that the magnetic field generated by the conductive element 103 on the magnetic substrate 101, thereby reducing the influence of the magnetic field on the magnetic substrate 101 generated by the first conductor segment 122 on the magnetic field on the magnetic substrate 101 generated by the second conductor segment 124.

In other embodiments, as shown in FIGS. 11 and 12, the orthographic projection of the conductive element 103 on the plane where the antenna coil 102 is located may be partly located on the winding center part 120. In other words, the area of the conductive element 103 on the plane of the X axis and the Y axis may be larger than the area of the first conductor segment 122 on the plane of the X axis and the Y axis.

As shown in FIG. 12, the antenna coil 102 and the conductive element 103 may be located on the two opposite surfaces of the dielectric substrate respectively 105. In some embodiments, the conductive element 103 may be adhered to the second surface of the dielectric substrate 105 toward to the magnetic substrate 101 by adhering, and the antenna coil 102 may be adhered to the first surface of the dielectric substrate 105 away from the magnetic substrate 101 by adhering, which is easy to operate and conductive to machine the antenna apparatus 10.

In other embodiments, the conductive element 103 may be disposed on the dielectric substrate 105. Manner of the conductive element 103 disposed on the dielectric substrate 105 may include but not limit to coating, etching and imprinting. In this embodiment, size of the antenna apparatus 10 along the Z axis may be reduced. In addition, the antenna coil 102 and the conductive element 103 may be manufactured by the same process, thereby improving uniformity of the antenna apparatus 10 and reducing step of the process.

Figure 13:
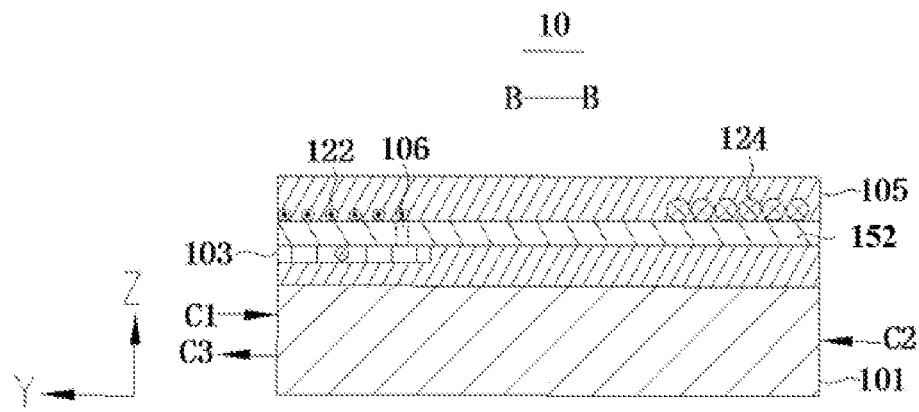
FIG. 13 is a cross-sectional structural schematic view of an antenna apparatus along a direction of line B-B in FIG. 11 according to another embodiment of the present disclosure.

As shown in FIG. 13, when the conductive element 103 and the antenna coil 102 is disposed on the dielectric substrate 105, the dielectric substrate 105 may include an insulation layer 152. The antenna coil 102 and the conductive element 103 may be respectively disposed on two opposite sides of the insulation layer 152. In other words, the antenna coil 102, the insulation layer 152, and the conductive element 103 may be orderly disposed on the dielectric substrate 105 along the backward of the Z axis. In some embodiments, the conductive element 103, the insulation layer 152, and the antenna coil 102 may be orderly disposed on the dielectric substrate 105 along the forward of the Z axis. The insulation layer 152 may be disposed in the dielectric substrate 105, thereby preventing the antenna coil 102 and the conductive element 103 from interfering with each other.

Figure 14:
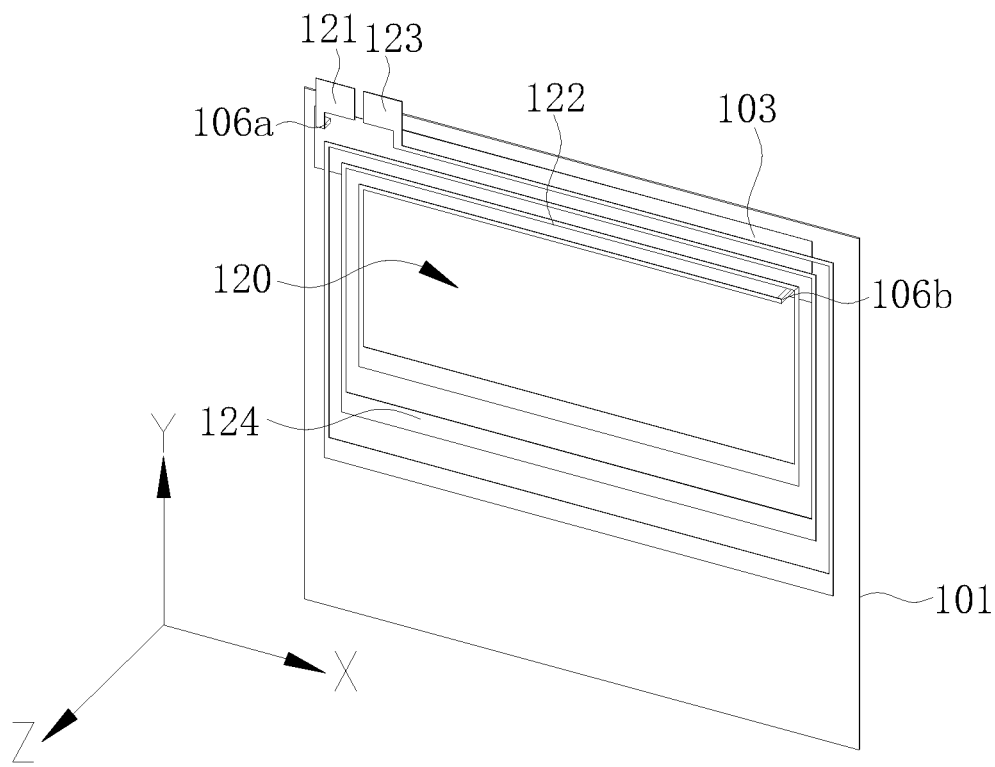
FIG. 14 is a structural schematic view of an antenna apparatus according to eighth embodiment of the present disclosure.

Further, as shown in FIGS. 13 and 14, the antenna coil 10 may also include an electric connector 106 disposed on the dielectric substrate 105. The electric connector 106 may be disposed between the antenna coil 102 and the conductive element 103. The electric connector 106 may be configured to electrically connect to the antenna coil 102 and the conductive element 103, such that the antenna coil 102 and the conductive element 103 may be connected in series in a same circuit. Manner of the conductive element 103 disposed on the electric connector 106 may include but not limit to coating, etching and imprinting.

Specifically, as shown in FIGS. 13 and 14, the electric connector 106 may include a first electric connector 106a and a second electric connector 106b. The first electric connector 106a may be configured to electrically connect to feed ends of the conductive element 103 and the antenna coil 102. The second electric connector 106b may be configured to electrically connect to feed ends of the first conductor segment 122 and the conductive element 103.

The antenna coil 102 and the conductive element 103 may be connected in series through the electric connector 106, thereby reducing circuit in the antenna coil 10. In addition, in response to the antenna coil 102 and the conductive element 103 being connected in series, value of the current in the antenna coil 102 and the conductive element 103. Therefore, waste can be avoided when the value of the current in the conductive element 103 is too large. In some embodiments, situation of the magnetic field generated by the conductive element 103 cancelling out less magnetic field generated by the first conductor segment 122 when the value of the current in the conductive element 103 is too small can be avoided.

In some embodiments, as shown in FIGS. 13 and 14, the antenna coil 102 may also include a first feed portion 121 and a second feed portion 123. The first feed portion 121, the second feed portion 123, the first conductor segment 122, and the second conductor segment 124 may be disposed on the same plane (the plane of the X axis and the Y axis). The first feed portion 121, the conductive element 103, the antenna coil 102, and the second feed portion 123 may be orderly connected in series. Specifically, an end of the first feed portion 121 may be electrically connected to the first electric connector 106a, an end of the first electric connector 106a away from the first feed portion 121 may be electrically connected to the conductive element 103, an end of the conductive element 103 away from the first electric connector 106a may be electrically connected to the second electric connector 106b, an end of t the second electric connector 106b away from the conductive element 103 may be electrically connected to the first conductor segment 122, and an end of the first conductor segment 122 away from the second electric connector 106b may be electrically connected to the second feed portion 123. Therefore, the first feed portion 121, the first electric connector 106a, the conductive element 103, the second electric connector 106b, the antenna coil 102, and the second feed portion 123 may form conducting circuit.

In some embodiments, as shown in FIGS. 13 and 14, a first connecting hole (not shown in the drawings) and a second connecting hole (not shown in the drawings) are defined in the dielectric substrate 105. The first connecting hole and the second connecting hole may be through hole defined in the insulation layer 152 of the dielectric substrate 105. The first connecting hole and the second connecting hole may be configured to receive the first electric connector 106a and the second electric connector 106b.

Figure 15:
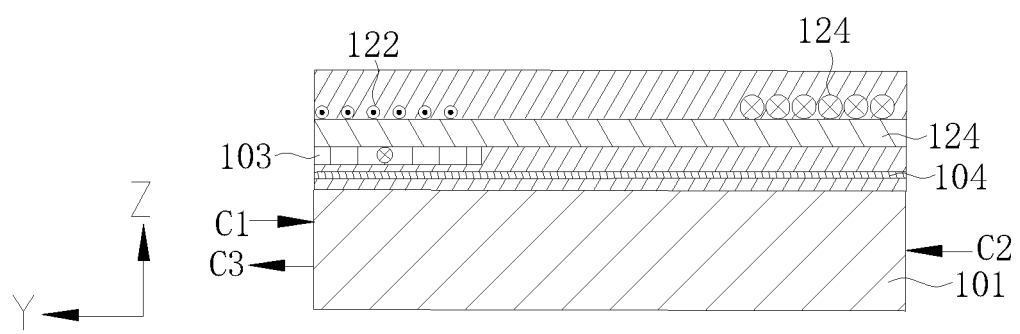
FIG. 15 is a cross-sectional structural schematic view of an antenna apparatus provided with a shielding member according to an embodiment of the present disclosure.

Further, as shown in FIG. 15, antenna coil 10 may further include a shielding member 104. The shielding member 104 may be a medium with a magnetic permeability different from a magnetic permeability of air. In response to the magnetic field generated by the first conductor segment 122 arriving the shielding member 104 through the air, the shielding member 104 enables the magnetic field strength and direction of the magnetic field generated by the first conductor segment 122 to change, thereby causing magnetic shield. In some embodiments, the shielding member 104 may be a metal shielding member 104. In response to the current in the first conductor segment 122 changing, the metal shielding member 104 cuts magnetic induction wire and generates Induced current and induced magnetic field, thereby cancelling out the magnetic field generated by the current in the first conductor segment 122.

Specifically, the shielding member 104 may be disposed between the conductive element 103 and the first conductor segment 122. In some embodiments, the shielding member 104 may be disposed between the conductive element 103 and the magnetic substrate 101.

In some embodiments, the shielding member 104 may be disposed between the conductive element 103 and the magnetic substrate 101, and the shielding member 104 may be disposed on the dielectric substrate 105. The shielding member 104 may be disposed on the dielectric substrate 105 through the process of coating, etching and imprinting, and disposed between the conductive element 103 and the magnetic substrate 101. That is, the first conductor segment 122, the shielding member 104, the conductive element 103, and the magnetic substrate 101 may be orderly disposed on the antenna apparatus 10 along the backward of the Z axis.

In other embodiments, the shielding member 104 may be disposed between the conductive element 103 and the first conductor segment 122. That is, the first conductor segment 122, the shielding member 104, the conductive element 103, and the magnetic substrate 101 may be orderly disposed on the antenna apparatus 10 along the backward of the Z axis.

In other embodiments, the shielding member 104 and the conductive element 103 may be disposed on same layer of the dielectric substrate 105, and insulating material may be disposed between the shielding member 104 and the conductive element 103. In other words, the shielding member 104 may be flush with the conductive element 103 along the Z axis.

The shielding member 104 may shield the magnetic field generated by the first conductor segment 122, and then reduce the magnetic field strength of the magnetic field generated by the first conductor segment 122 on the magnetic substrate 101, such that the magnetic field generated by the current in the first conductor segment 122 cancel out less magnetic field generated by the current in the second conductor segment 124. Therefore, the magnetic field strength around the second conductor segment 124 can be enhanced.

An antenna apparatus is provided, and includes a dielectric substrate, a conductive element and an antenna coil disposed on a first surface of the dielectric substrate; the antenna coil includes a winding center part, at least one first conductor segment and at least one second conductor segment, the first conductor segment and the second conductor segment are respectively disposed on two opposite sides of the winding center par, the first conductor segment and the second conductor segment are in series connection; the conductive element is disposed on a second surface of the dielectric substrate opposite to the first surface or disposed in an interior of the dielectric substrate, disposed opposite to the first conductor segment, and the conductive element is electrically connected to the first conductor segment; orthographic projection of the conductive element on the dielectric substrate covers at least one part of orthographic projection of the first conductor segment on the dielectric substrate; a magnetic field generated by the conductive element is configured to cancel out a magnetic field generated by the first conductor segment.

In some embodiments, the first conductor segment includes a first conductor sub-segment and a second conductor sub-segment, the second conductor segment includes a third conductor sub-segment and a fourth conductor sub-segment; the first conductor sub-segment and the third conductor sub-segment are respectively disposed on two opposite sides of the winding center part along a first direction, and the second conductor sub-segment and the fourth conductor sub-segment are respectively disposed on two opposite sides of the winding center part along a second direction; the first direction intersects the second direction; the conductive element includes a first conductive part and a second conductive part intersecting the first conductive part, the first conductive part is configured to cancel out a magnetic field generated by the first conductor sub-segment, and the second conductive part is configured to cancel out a magnetic field generated by the second conductor sub-segment.

In some embodiments, the antenna apparatus further includes a magnetic substrate disposed opposite to the dielectric substrate; a magnetic field on the dielectric substrate generated by the conductive element is configured to cancel out at least one part of a magnetic field on the dielectric substrate generated by the first conductor segment.

In some embodiments, a plane where the magnetic substrate is located is parallel to a plane where the antenna coil is located; the conductive element is disposed on one side of the antenna coil toward to the magnetic substrate; or the conductive element is disposed on the one side of the antenna coil away from the magnetic substrate.

In some embodiments, orthographic projection of the magnetic substrate on a plane where the antenna coil is located covers at least part of the second conductor segment.

In some embodiments, the magnetic substrate includes a first magnetic region, a second magnetic region, and a third magnetic region which are connected; the third magnetic region is disposed between the first magnetic region and the second magnetic region; orthographic projection of the third magnetic region on the plane where the antenna coil is located covers the second conductor segment; orthographic projection of the first magnetic region on the plane where the antenna coil is located covers at least part of the winding center part; orthographic projection of the second magnetic region on the plane where the antenna coil is located is located on a side of the second conductor segment away from the winding center part.

In some embodiments, the orthographic projection of the first magnetic region on the plane where the antenna coil is located covers at least part of the first conductor segment.

In some embodiments, area of the second magnetic region is larger than or equal to area of the first magnetic region.

In some embodiments, direction of current in the first conductor segment is opposite to direction of current in the conductive element.

In some embodiments, orthographic projection of the conductive element on the plane where the antenna coil is located covers the first conductor segment.

In some embodiments, the antenna coil includes a plurality of first conductor segments spaced apart, the orthographic projection of the conductive element on the plane where the antenna coil is located covers the plurality of first conductor segments.

In some embodiments, the orthographic projection of the conductive element on the plane where the antenna coil is located covers at least part of the winding center part.

In some embodiments, in direction of the first conductor segment toward to the second conductor segment, a width of the first conductor segment is smaller than a width of the second conductor segment.

In some embodiments, the antenna apparatus further includes a shielding member disposed on the dielectric substrate; the shielding member is configured to shield at least part of magnetic field generated by the first conductor segment.

In some embodiments, the shielding member is disposed between the first conductor segment and the conductive element; or the antenna apparatus includes a magnetic substrate disposed opposite to the dielectric substrate, the shielding member is disposed between the conductive element the magnetic substrate.

In some embodiments, the antenna apparatus further includes a first feed portion and a second feed portion disposed on a side of the first conductor segment away from the winding center part; the first feed portion, conductive element, the first conductor segment, the second conductor segment, and the second feed portion are orderly connected in series.

In some embodiments, the dielectric substrate includes an insulation layer disposed in the dielectric substrate, and the conductive element and the antenna coil are respectively disposed two opposite sides of the insulation layer.

In some embodiments, the antenna apparatus further includes at least two electric connectors; the dielectric substrate further includes at least two connecting holes passing through the insulation layer, the electric connectors are disposed in the connecting holes, at least one of the electric connectors is configured to electrically connected to the conductive element and the first feed portion, at least one of the electric connectors is configured to electrically connected to the conductive element and the first conductor segment.

An electronic device is provided, and includes a camera module and any antenna apparatus mentioned above, the antenna apparatus is disposed around the camera module; or the antenna apparatus is disposed opposite to the camera module.

In some embodiments, the antenna apparatus rounds at least two adjacent sides of the camera module.

Above description are only specific embodiments of the present disclosure, but does not limit the protection scope of the present disclosure. Any person skilled in the art can easily think of changes or substitutions within the technical scope disclosed by the present disclosure, and these should be covered within the protection scope of the present disclosure. Therefore, the protection scope of the present disclosure should be subject to the protection scope of claims.

What is claimed is:

1. An antenna apparatus, comprising:
   a dielectric substrate;
   an antenna coil, disposed on a first surface of the dielectric substrate, and comprising a winding center part, at least one first conductor segment and at least one second conductor segment, the first conductor segment and the second conductor segment being respectively disposed at two opposite sides of the winding center part, the first conductor segment and the second conductor segment being in series connection;
   a conductive element, disposed on a second surface of the dielectric substrate opposite to the first surface or disposed in an interior of the dielectric substrate, disposed opposite to the first conductor segment, and electrically connected to the first conductor segment, orthographic projection of the conductive element on the dielectric substrate covering at least one part of orthographic projection of the first conductor segment on the dielectric substrate, a magnetic field generated by the conductive element being configured to cancel out a magnetic field generated by the first conductor segment; and a first feed portion and a second feed portion disposed on a side of the first conductor segment away from the winding center part; wherein the first feed portion, the conductive element, the first conductor segment, the second conductor segment, and the second feed portion are orderly connected in series.

2. The antenna apparatus as claimed in claim 1, wherein the first conductor segment comprises a first conductor sub-segment and a second conductor sub-segment, the second conductor segment comprises a third conductor sub-segment and a fourth conductor sub- segment; the first conductor sub-segment and the third conductor sub-segment are respectively disposed on two opposite sides of the winding center part along a first direction, and the second conductor sub-segment and the fourth conductor sub-segment are respectively disposed on two opposite sides of the winding center part along a second direction; the first direction intersects the second direction; the conductive element comprises a first conductive part and a second conductive part intersecting the first conductive part, the first conductive part is configured to cancel out a magnetic field generated by the first conductor sub-segment, and the second conductive part is configured to cancel out a magnetic field generated by the second conductor sub-segment.

3. The antenna apparatus as claimed in claim 1, comprising a magnetic substrate disposed opposite to the dielectric substrate; wherein a magnetic field on the dielectric substrate generated by the conductive element is configured to cancel out at least one part of a magnetic field on the dielectric substrate generated by the first conductor segment.

4. The antenna apparatus as claimed in claim 3, wherein a plane where the magnetic substrate is located is parallel to a plane where the antenna coil is located; the conductive element is disposed on one side of the antenna coil toward to the magnetic substrate;

or the conductive element is disposed on the one side of the antenna coil away from the magnetic substrate.

5. The antenna apparatus as claimed in claim 3, wherein orthographic projection of the magnetic substrate on a plane where the antenna coil is located covers at least part of the second conductor segment.

6. The antenna apparatus as claimed in claim 5, wherein the magnetic substrate comprises a first magnetic region, a second magnetic region, and a third magnetic region which are connected; the third magnetic region is disposed between the first magnetic region and the second magnetic region; orthographic projection of the third magnetic region on the plane where the antenna coil is located covers the second conductor segment; orthographic projection of the first magnetic region on the plane where the antenna coil is located covers at least part of the winding center part; orthographic projection of the second magnetic region on the plane where the antenna coil is located is located on a side of the second conductor segment away from the winding center part.

7. The antenna apparatus as claimed in claim 6, wherein the orthographic projection of the first magnetic region on the plane where the antenna coil is located covers at least part of the first conductor segment.

8. The antenna apparatus as claimed in claim 7, wherein area of the second magnetic region is larger than or equal to area of the first magnetic region.

9. The antenna apparatus as claimed in claim 1, wherein direction of current in the first conductor segment is opposite to direction of current in the conductive element.

10. The antenna apparatus as claimed in claim 1, wherein orthographic projection of the conductive element on a plane where the antenna coil is located covers the first conductor segment.

11. The antenna apparatus as claimed in claim 10, wherein the antenna coil comprises a plurality of first conductor segments spaced apart, the orthographic projection of the conductive element on the plane where the antenna coil is located covers the plurality of first conductor segments.

12. The antenna apparatus as claimed in claim 11, wherein the orthographic projection of the conductive element on the plane where the antenna coil is located covers at least part of the winding center part.

13. The antenna apparatus as claimed in claim 1, wherein in direction of the first conductor segment toward to the second conductor segment, a width of the first conductor segment is smaller than a width of the second conductor segment.

14. The antenna apparatus as claimed in claim 1, comprising a shielding member disposed on the dielectric substrate; wherein the shielding member is configured to shield at least part of magnetic field generated by the first conductor segment.

15. The antenna apparatus as claimed in claim 14, wherein the shielding member is disposed between the first conductor segment and the conductive element; or the antenna apparatus comprises a magnetic substrate disposed opposite to the dielectric substrate, the shielding member is disposed between the conductive element the magnetic substrate.

16. The antenna apparatus as claimed in claim 1, wherein the dielectric substrate comprises an insulation layer disposed in the dielectric substrate, and the conductive element and the antenna coil are respectively disposed two opposite sides of the insulation layer.

17. The antenna apparatus as claimed in claim 16, comprising at least two electric connectors; wherein the dielectric substrate further comprises at least two connecting holes passing through the insulation layer, the electric connectors are disposed in the connecting holes, at least one of the electric connectors is configured to electrically connected to the conductive element and the first feed portion, at least one of the electric connectors is configured to electrically connected to the conductive element and the first conductor segment.

18. An electronic device, comprising:
a camera module; and
an antenna apparatus, disposed around or opposite to the camera module, and comprising:
a dielectric substrate;
an antenna coil, disposed on a first surface of the dielectric substrate, and comprising a winding center part, at least one first conductor segment and at least one second conductor segment, the first conductor segment and the second conductor segment being respectively disposed at two opposite sides of the winding center part, the first conductor segment and the second conductor segment being in series connection;
a conductive element, disposed on a second surface of the dielectric substrate opposite to the first surface or disposed in an interior of the dielectric substrate, disposed opposite to the first conductor segment, and electrically connected to the first conductor segment, orthographic projection of the conductive element on the dielectric substrate covering at least one part of orthographic projection of the first conductor segment on the dielectric substrate, a magnetic field generated by the conductive element being configured to cancel out a magnetic field generated by the first conductor segment; and a first feed portion and a second feed portion disposed on a side of the first conductor segment away from the winding center part; wherein the first feed portion, the conductive element, the first conductor segment, the second conductor segment, and the second feed portion are orderly connected in series.

19. The electronic device as claimed in claim 18, wherein the antenna apparatus rounds at least two adjacent sides of the camera module.

\* \* \* \* \*